No. 675,644. Patented June 4, 1901.
A. C. STEWART.
STEERING DEVICE FOR MOTOR VEHICLES.
(Application filed July 19, 1900.)
(No Model.)
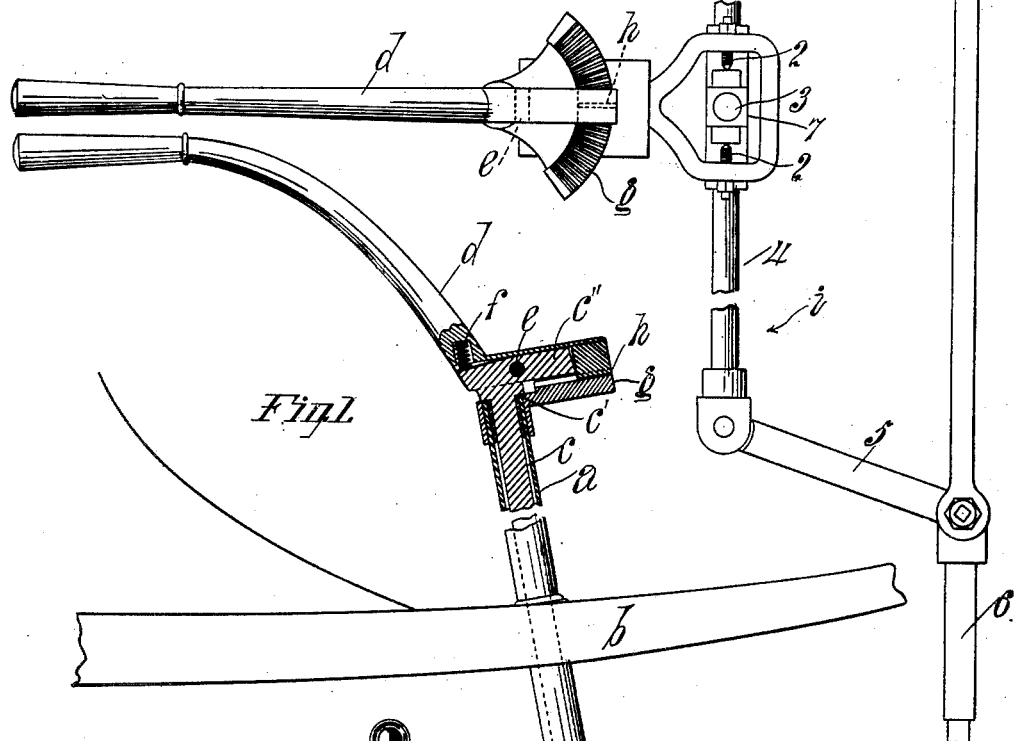
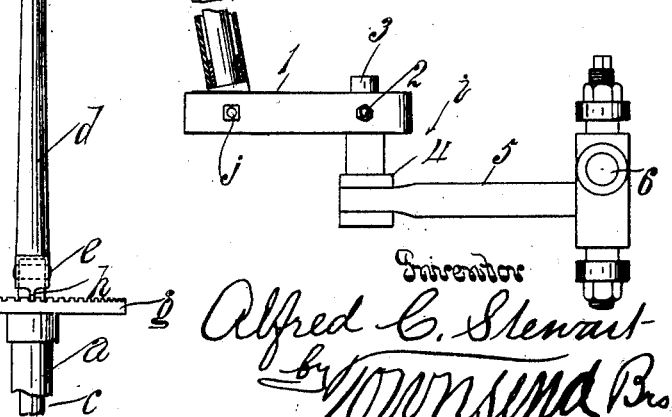

UNITED STATES PATENT OFFICE.

ALFRED C. STEWART, OF SANTA PAULA, CALIFORNIA.

STEERING DEVICE FOR MOTOR-VEHICLES.

SPECIFICATION forming part of Letters Patent No. 675,644, dated June 4, 1901.

Application filed July 19, 1900. Serial No. 24,242. (No model.)

*To all whom it may concern:*

Be it known that I, ALFRED C. STEWART, a citizen of the United States, residing at Santa Paula, in the county of Ventura and State of California, have invented new and useful Improvements in Steering Devices for Motor-Vehicles, of which the following is a specification.

One object of my invention is to provide a simple appliance by which to avoid communicating any vibration from the steering device to the hand of the driver.

Another object is to simplify the means of locking and releasing the steering device and to so construct and arrange the same that the driver can lock and release the steering device by a very simple and extremely convenient movement of the hand, so that with very slight attention he will be able to throw the steering device into any desired position and when desired can leave the steering device locked in position for a given course, so that the hand of the driver is required to be upon the handle only when changing the course of the vehicle.

My invention is applicable in various forms, and it is unnecessary to illustrate all of the modes in which my invention may be carried out.

The accompanying drawings illustrate my invention in the simplest and most desirable form in which I have embodied the same.

Figure I is a side elevation of my invention, partly in section, applied to a motor-vehicle, fragments of which are shown. Fig. II is a plan view of the same. Fig. III is a front elevation of the handle and locking device attached to the shaft and post.

$a$ indicates a hollow post carried by the vehicle $b$.

$c$ indicates a shaft journaled to the post, being supported by the shoulder $c'$ at the top of the shaft.

$d$ indicates a handle pivoted to the shaft by a transverse horizontal pivot $e$.

A suitable locking device is provided for locking the shaft against rotation, and the same comprises a member on the post and a member on the handle, which members are normally held in engagement with each other by a spring $f$. In the form shown in the drawings the locking member on the post consists in an arc-rack $g$, fixed to the head of the post and projecting forward therefrom, and the locking member on the handle consists in a catch $h$ to engage with the arc-rack $g$ to prevent the handle from turning. The spring $f$ is located behind the pivot $e$, which pivots the handle $d$ to the head $c''$ of the shaft, so that the spring acts against the force of gravity to normally hold the free end of the handle elevated. The handle $d$ has a limited movement on the head $c''$, and when the hand of the driver rests upon the handle a downward movement of the hand depresses the handle and lifts the catch $h$ out of engagement with the rack, thus leaving the handle free to be moved to turn the shaft $c$.

$i$ indicates axle-operating mechanism of any suitable form connected with the shaft $c$ by a pivot $j$, which extends at right angles to the axis of the shaft $c$.

The steering mechanism which I have shown comprises a connecting-link 1, pivoted at one end by the pivot $j$ to the shaft $c$, and pivoted at the other end by the pivot-points 2 to the pivoted block 7, which is mounted to turn on the pivot-arm 3, which extends upward from the bar 4.

5 indicates the connecting-rods, which connect the bar 4 with the axles 6 in the usual way.

In practical operation when the driver desires to change the course of the vehicle he will rest his hand upon the handle $d$ and will depress the handle against the force of the spring $f$ to remove the catch $h$ from the rack $g$. Then a movement to the right or left will rotate the shaft $c$ to operate the axle-operating mechanism to bring the axles to the required position. When the vehicle is going in a course in which it can continue for considerable time, the driver may allow the handle to be returned by the spring $f$ to the locking position, (shown in Fig. I,) where it will remain until again shifted by the driver.

What I claim, and desire to secure by Letters Patent of the United States, is—

1. A steering device for motor-vehicles, comprising a post carried by the vehicle; an upright shaft journaled to said post; a handle pivoted to said shaft; a spring acting against the force of gravity to yieldingly uphold the handle in normal position; mechanism to lock the handle against rotation when the handle is in normal position and to release the handle when it is thrown to compress the spring; and axle-operating means connected with said shaft to be operated thereby.

2. A steering device for motor-vehicles, comprising a post carried by the vehicle and provided with a horizontal arc-rack extending in front of the post; an upright shaft journaled to said post and provided with a handle-supporting head; a handle pivoted on said head and arranged to have a limited movement thereon, and extending rearwardly from the post; a dog fastened to the handle in front of the pivot and arranged to engage with the arc-rack; a spring to normally uphold the handle to throw the dog into engagement with the arc-rack; and axle-operating means connected with said shaft to be operated thereby.

3. A steering device for motor-vehicles, comprising a post carried by the vehicle; a shaft journaled to the post; a handle pivoted to the shaft by a transverse pivot; a locking device for locking the shaft against rotation, and comprising a member on the post and a member on the handle; a spring acting against the force of gravity for yieldingly holding the handle in position, to maintain the two members in locking engagement with each other, and to allow the handle to be thrown downward to disengage said locking parts; and axle-operating means connected with said shaft to be operated thereby.

In testimony whereof I have subscribed my name to this specification, in the presence of two witnesses, at Los Angeles, California, this 10th day of July, 1900.

ALFRED C. STEWART.

Witnesses:
JAMES R. TOWNSEND,
JULIA TOWNSEND.